United States Patent
Herzog (10) Patent No.: US 9,544,078 B2
(45) Date of Patent: Jan. 10, 2017

(54) METHOD AND SYSTEM FOR OPTIMIZING SHORT TERM STABILITY OF A CLOCK PULSE

(71) Applicant: Rohde & Schwarz GmbH & Co. KG, Munich (DE)

(72) Inventor: Norman Herzog, Berlin (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 220 days.

(21) Appl. No.: 14/367,934

(22) PCT Filed: Dec. 20, 2012

(86) PCT No.: PCT/EP2012/076370
§ 371 (c)(1),
(2) Date: Jun. 22, 2014

(87) PCT Pub. No.: WO2013/092853
PCT Pub. Date: Jun. 27, 2013

(65) Prior Publication Data
US 2015/0016476 A1    Jan. 15, 2015

(30) Foreign Application Priority Data

Dec. 23, 2011  (DE) .......... 10 2011 089 721
Mar. 15, 2012  (DE) .......... 10 2012 204 084

(51) Int. Cl.
*H04J 3/06*       (2006.01)
*H04N 21/242*    (2011.01)

(52) U.S. Cl.
CPC ............ *H04J 3/0697* (2013.01); *H04J 3/0635* (2013.01); *H04J 3/0658* (2013.01); *H04N 21/242* (2013.01); *H04J 3/0667* (2013.01)

(58) Field of Classification Search
CPC ..... H04N 21/242; H04J 3/0635; H04J 3/0658;
H04J 3/0667; H04J 3/0638; H04J 3/0644;
H04J 3/0661; H04J 3/0664; H04L
7/00–7/10; H04W 56/00; H04W 56/001;
H04W 56/0015; H04W 56/0035; G06F
1/12; G11B 27/10
(Continued)

(56) References Cited

U.S. PATENT DOCUMENTS 5,327,425 A * 7/1994 Niwa ................ H04L 12/28
                                                    370/452
5,790,543 A   8/1998 Cloutier
(Continued)

FOREIGN PATENT DOCUMENTS

DE    102009057362 A1    4/2011
EP        1122622 A1    8/2001
(Continued)

OTHER PUBLICATIONS

Herzog, "International Preliminary Report on Patentability", PCT/EP2012/076370, WO2013092853, Jul. 3, 2014.
(Continued)

*Primary Examiner* — Mark Rinehart
*Assistant Examiner* — Kenneth P Hunt
(74) *Attorney, Agent, or Firm* — Potomac Technology Law, LLC (57) ABSTRACT

A system for optimizing short-term stability of a clock source clock pulse synchronized with a long-term stable reference-clock transmits clock numbers of a first reference clock to the clock source, between an initialization time and several times within a data-packet network. The clock pulse is adjusted by controlling a difference between clock numbers of the first reference clock received in the clock source and clock numbers of the first reference clock between the initialization time and the reception times of the clock numbers of the first reference clock. Clock numbers of a (Continued)

second reference clock are transmitted to the clock source with the clock number of at least one second reference-clock source at individual times. The maximum difference between the first and the second reference clock is known. The difference between the clock pulse of the clock source and each second reference clock is limited to an adjustable threshold value.

15 Claims, 7 Drawing Sheets

(58) Field of Classification Search
USPC .......... 370/503–520; 375/354–377; 713/400, 713/600; 455/502; 709/248; 342/357.62; 368/46, 47, 55, 59; 702/176
See application file for complete search history.

(56) References Cited

U.S. PATENT DOCUMENTS

| | | | |
|---|---|---|---|
| 5,943,381 A | 8/1999 | Zampetti | |
| 6,631,483 B1* | 10/2003 | Parrish | H04J 3/0688 713/400 |
| 7,421,048 B2* | 9/2008 | Ducharme | H04N 21/23406 327/141 |
| 7,613,212 B1* | 11/2009 | Raz | H04J 3/0641 370/510 |
| 7,724,612 B2 | 5/2010 | Azim | G01S 19/256 368/47 |
| 2003/0048811 A1* | 3/2003 | Robie, Jr. | H04J 3/0667 370/509 |
| 2004/0062278 A1 | 4/2004 | Hadzic | |
| 2006/0088023 A1 | 4/2006 | Muller | |
| 2007/0226530 A1* | 9/2007 | Celinski | G06F 1/12 713/500 |
| 2008/0008285 A1* | 1/2008 | Smith | H03D 3/248 375/376 |
| 2008/0049743 A1* | 2/2008 | Zampetti | G04G 5/00 370/389 |
| 2008/0270800 A1 | 10/2008 | Krober | |
| 2008/0287153 A1* | 11/2008 | Fullam | H04H 20/67 455/502 |
| 2010/0067507 A1* | 3/2010 | Park | H04J 3/0638 370/338 |
| 2010/0091760 A1* | 4/2010 | Yoon | G04G 5/002 370/350 |
| 2010/0138187 A1* | 6/2010 | Dzung | H04J 3/0682 702/176 |
| 2011/0161524 A1* | 6/2011 | Na | H04W 56/0015 709/248 |

FOREIGN PATENT DOCUMENTS

| | | |
|---|---|---|
| EP | 1469646 A2 | 10/2004 |
| WO | WO2007/117756 A2 | 10/2007 |
| WO | WO2009/132456 A1 | 11/2009 |

OTHER PUBLICATIONS

Burbank, et al., "Network Time Protocol Version 4 Protocol and Algorithms Specification", draft-ietf-ntp-ntpv4-proto-13, Internet-Draft, IETF, Oct. 9, 2009.

* cited by examiner

METHOD AND SYSTEM FOR OPTIMIZING SHORT TERM STABILITY OF A CLOCK PULSE

CROSS-REFERENCE TO RELATED APPLICATION(S)

The present application is a national phase application of PCT application No. PCT/EP2012/076370 (filed Dec. 20, 2012), and claims priority to German Patent Application Nos. DE 102011089721.6 (filed Dec. 23, 2011) and DE 102012204084.6 (filed Mar. 15, 2012), the entireties of which are incorporated herein by reference.

FIELD

The invention relates to a method and a system for optimizing short-term stability of a clock pulse.

BACKGROUND

In networks, especially networks with high real-time requirements, for example, in a head station (a so-called head end), in which a digital datastream with video and audio data associated in each case with different programs is generated for transmission within a digital radio system, the clock sources used are synchronized with a reference-clock source. In this context, the Global-Position-System (GPS)-time, which is broadcast via GPS-satellites as a high-precision time signal in the form of one-second pulses (1 Pulse Per Second (PPS)) or in the form of a 10 MHz reference clock, or the Network-Time-Protocol (NTP), which transmits reference-time information of the Universal-Time-Coordinated (UTC)-time from an NTP-server via a data-packet orientated network, preferably via the Internet upon demand from a requesting client, are used as the reference-clock source.

Figure 1:
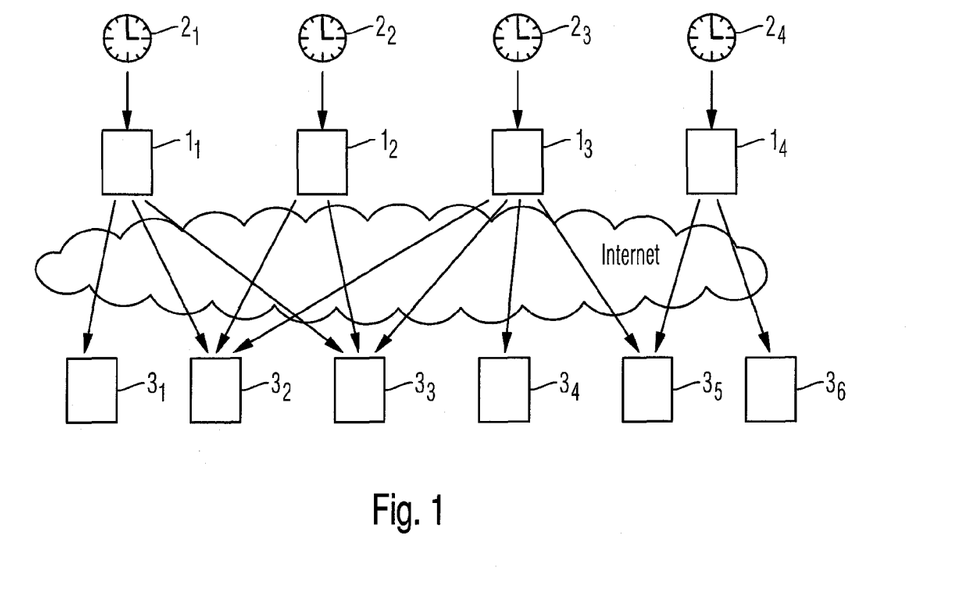
FIG. 1 illustrates a block-circuit diagram of a system for clock synchronization of several data-processing units by means of the Network-Time-Protocol.

As shown in FIG. 1, timestamp information based on the reference time is transmitted in data packets from primary time-servers $1_1$, $1_2$, $1_3$ and $1_4$, the so-called NTP-servers, which are coupled with a high-precision reference-time source $2_1$, $2_2$, $2_3$ and $2_4$, the UTC reference-time source, upon demand from a secondary server $3_1$, $3_2$, $3_3$ and $3_4$. On the basis of the transmission time from the requesting, secondary server to the NTP-server and from the NTP-server to the requesting secondary server, which depends upon the level of data traffic in the Internet, the requesting, secondary server receives the requested time with a statistical time delay. This statistical time delay, which leads to an inaccuracy of the time in the requesting, secondary server, must be minimized as far as possible via appropriate algorithms.

Figure 2:
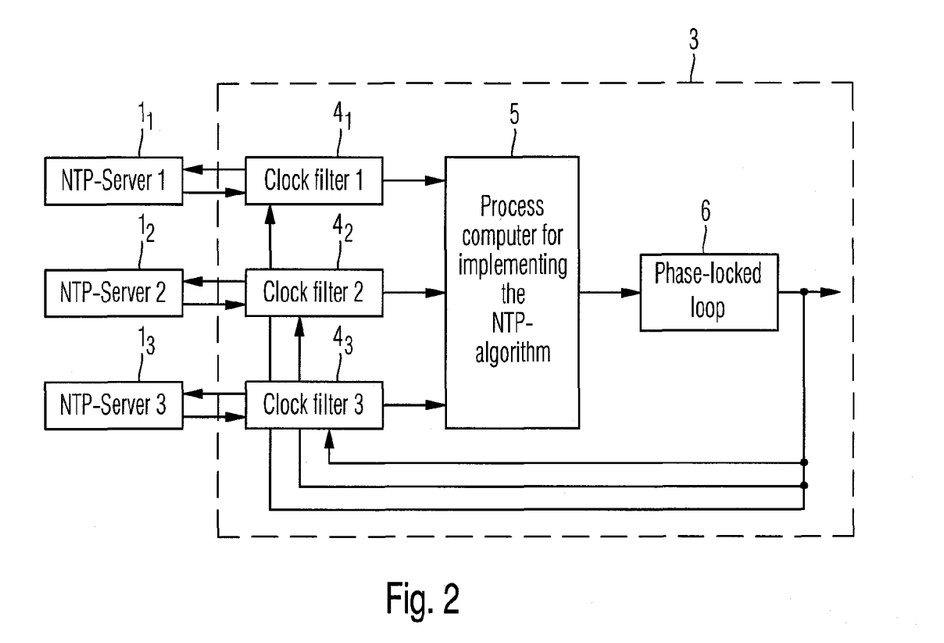
FIG. 2 illustrates a block-circuit diagram of a system for clock synchronization of a data-processing unit by means of the Network-Time-Protocol.

One possibility for minimizing the inaccuracy of the requested time is implemented according to FIG. 2 in the case of several NTP-servers upon demand from the requesting clock filters $4_1$, $4_2$ and $4_3$ of the secondary server 3. The minimum time, which corresponds to the smallest transmission delay, is selected from all of the received times in a sub-computer 5 of the secondary server 3 by means of an NTP-algorithm. Finally, NTP-servers in which the transmission time from the time request to reception of the time information is subject to major statistical fluctuations and/or the time information is basically false are eliminated.

A further minimization of this statistical time delay is realized by a phase-locked loop 6, a so-called phase-locked loop (PLL), integrated in the secondary server 3, in which the received times represent the clock pulses of the associated reference-time source counted in the NTP-server from an initialization time until the respective transmission time and therefore represent phases, are compared and corrected with the counted clock pulses of the associated reference-time source at the reception time of the individual timestamp information in the secondary server 3, which also represent phases. In the phase-locked loop, a minimization of this phase jitter or phase noise is implemented by averaging in an averaging filter over several phase differences. The clock number of the associated reference-time source counted in the secondary server at the reception time of the individual timestamp information is obtained from the received clock number with the addition of the clock pulses of the associated reference-time source counted in the time interval between the transmission time in the primary server and the reception time in the secondary server. The transmission time in the primary server is selected approximately, as a mean value between the time of the time request by the secondary server and the time of reception of the associated timestamp information in the secondary server.

A clock source for a head end, of which the clock pulse is also synchronized with the long-term stable reference clock of an NTP-server is known from DE 10 2009 057 362 A1. For the simultaneous increase of the short-term stability of the clock pulse of the clock source, the long-term stable reference clock of the NTP-server is interpolated with the short-term stable reference clock of a further reference-clock source.

Both the implementation of the averaging and also the interpolation requires a certain processing time within which a drift of the clock pulse of the clock source in the secondary server occurs, which leads to an accumulated time offset of the clock source of typically a few tens of milliseconds within a delay time of one hour. In this context, a change in the ambient temperature leads to a relatively rapid frequency change of the clock source, which is recognized and corrected by the averaging only subject to a delay. In the case of real-time applications of a head end, this can lead to an overflow or a zero loading of the buffer, in which the individual data packets of the digital transport datastream to be transmitted are buffered, and accordingly to a loss of data packets to be transmitted or a gap in transmission, which, in each case, represent unacceptable operating conditions.

What is needed, therefore, is an approach for rapid-response optimization of the short-term stability of a clock pulse of a clock source, which is already synchronized with a long-term stable reference clock.

SUMMARY

Embodiments of the present invention advantageously address the foregoing requirements and needs, as well as others, by providing an approach for rapid-response optimization of the short-term stability of a clock pulse of a clock source, which is already synchronized with a long-term stable reference clock.

According to example embodiments of the present invention, in addition to the transmission of a clock number of a first reference clock from a first reference-clock source, which are each counted between an initialization time and individual times in the first reference-clock source via a data-packet orientated network to a clock source, and a clock generation in the clock source by correcting the respectively transmitted clock number with the clock pulses counted in the reference-clock source between the initialization time and the reception time of the respectively transmitted clock number in the clock source, a clock number of a second reference clock of a second reference-clock source is transmitted to the clock source.

By way of example, the second reference-clock source is free-running by comparison with the first reference-clock source, so that its clock pulses, counted respectively at the individual times, do not relate to the time-corrected clock numbers of the first reference-clock source. The maximum deviation of the second reference clock from the time-corrected first reference clock is preferably known and constant. Accordingly, the second reference clock represents a corridor for a maximum deviation of the first reference clock in the clock source determined from the clock numbers of the first reference clock, which is time-delayed by the transmission and accordingly error-laden, from the correct, first reference clock generated in the first reference-clock source. In this manner, in a first embodiment of the invention, the difference between the clock pulse generated by the clock source and the second reference clock is limited to the known maximum difference between first or second reference clock by controlling the clock pulse generated by the clock source in a superordinate frequency control or clock-pulse control in such a manner that this condition is fulfilled.

In order to reconstruct the second reference clock in the clock source, the individual counted clock numbers of the second reference clock in the second reference-clock source are transmitted with a constant periodicity to the clock source via a second network, which is preferably a local high-speed network with short transmission times. Since the second reference clock in the clock source is determined from the individual clock sources of the second reference clock received respectively from the second reference-clock source, which are slightly statistically time-displaced relative to the clock numbers of the second reference clock at the associated transmission time, a slight deviation is obtained between the second reference clock determined in the clock source and the correctly generated second reference clock in the second reference-clock source. A consideration of this deviation of the second reference clock is taken into account in that the difference between the clock pulse generated by the clock source and the second reference clock determined in the clock source is limited to a maximum difference between first and second reference clock increased by a first adjustable threshold value.

Figure 3:
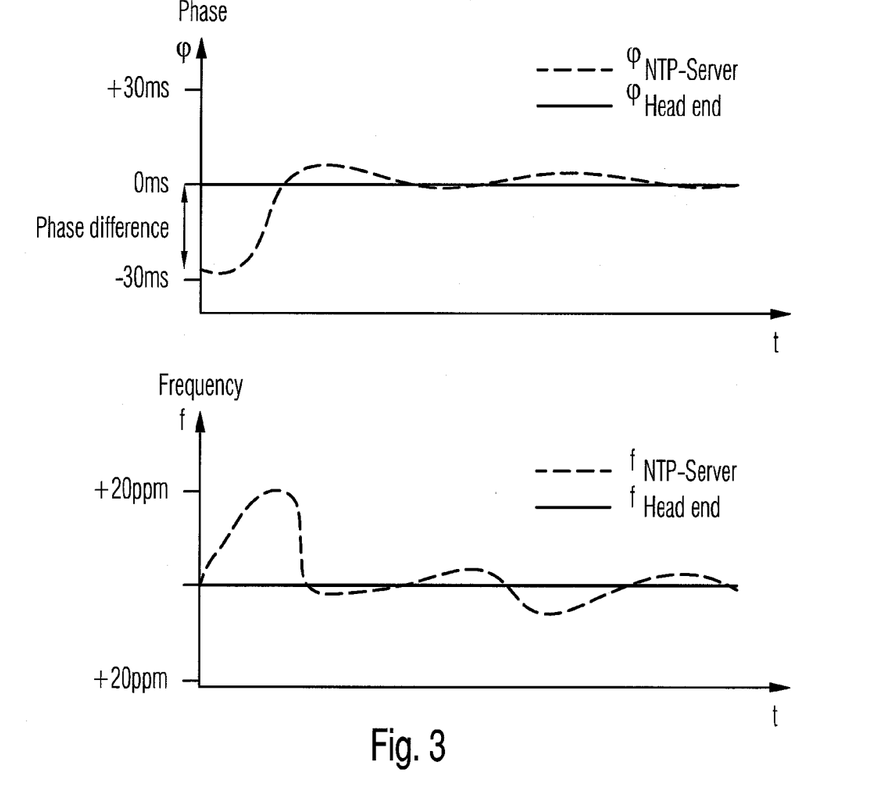
FIG. 3 illustrates a time-flow diagram of the phase and the frequency in a phase-locked loop.

According to one example embodiment, the generation of the clock pulse in the clock source from the received clock numbers of the first reference clock is implemented through a phase control and/or frequency control. In the case of a phase control, the received clock number of the first reference clock is controlled to the clock number of the first reference clock determined in the clock source, counted in the first reference-clock source at the reception time of the clock number of the first reference clock to be transmitted. The frequency of a frequency oscillator as shown in FIG. 3 integrated in the phase control required for matching the clock number of the first reference clock represents the change of the clock pulse in the clock source required at least within the time interval of the correction and therefore the deviation of the clock pulse currently generated in the clock source present within the time interval of the correction from the corrected, first reference clock. Here also, the second reference clock represents a corridor for the deviation between the current clock pulse generated in the clock source from the corrected first reference clock, so that, in a second embodiment of the invention, the difference between the clock generated in the clock source and the second reference clock is limited to a second adjustable threshold value.

By way of example, the second reference clock is generated in a single, second reference-clock source and transmitted to the clock source.

By way of further example, in several second reference-clock sources, the second reference clocks in each case are generated and transmitted to the clock source. In the clock source, the determination of the second reference clock is implemented by averaging all of the received second reference clocks. If the individual second reference-clock sources each provide a non-temperature-compensated frequency oscillator for generating the individual second reference clock, the individual second reference clocks drift in the same direction in the case of a temperature change, and an improvement in the accuracy of the second reference clock in the clock source through the multiple design of the second reference-clock sources is not provided. By contrast, if the frequency oscillators in the individual second reference-clock sources are all temperature compensated, the drift of the individual second reference clocks is limited only to the significantly less pronounced manufacturing tolerance and compensation accuracy of the individual frequency oscillators, and the second reference clock averaged in the clock source provides a significantly higher accuracy.

In the case of a failure of the data-packet orientated network, that is, for example, in the case of a failure of the Internet from the first reference-clock source to the clock source, the second reference clock in the clock source is determined continuously from the received clock numbers of the second reference clock by means of a linear regression of a given number of received clock numbers, and the clock pulse of the clock source is determined within the framework of a frequency control with the determined second reference clock as the target reference value.

As an alternative, in the case of a failure of the data-packet orientated network from the first reference-clock source to the clock source, a first reference clock, which serves as a target frequency value of a frequency control controlling the clock pulse of the clock source for the period of the failure is determined by means of a linear regression from the clock numbers of the first reference-clock source received up to the time of the failure of the data-packet orientated network. As a result of the lack of short-term stability of the first reference clock and the lack of clock numbers of the first reference clock during the failure of the data-packet orientated network, the accuracy of a clock pulse generated in this manner is significantly lower by comparison with the clock pulse generated as a target frequency value in a frequency control with the second reference clock.

If the interval between the clock pulse of the clock source and the second reference clock becomes greater than a third adjustable threshold value, that is, if a significant interval is present between the clock pulse generated in the clock source, which typically deviates from the first reference clock, and the first reference clock correctly generated in the first reference-clock source, in a third embodiment of the invention, the rate with which clock numbers of the first reference clock are transmitted from the first reference-clock source to the clock source is increased. In this manner, the first reference clock in the clock source is reconstructed in relatively short time intervals and accordingly, a drift of the clock pulse generated in the clock source from the correct first reference clock is minimized.

BRIEF DESCRIPTION OF THE DRAWINGS

Various example embodiments of the present invention are explained in detail below with reference to the drawings. The figures of the drawings show.

DETAILED DESCRIPTION

Figure 4:
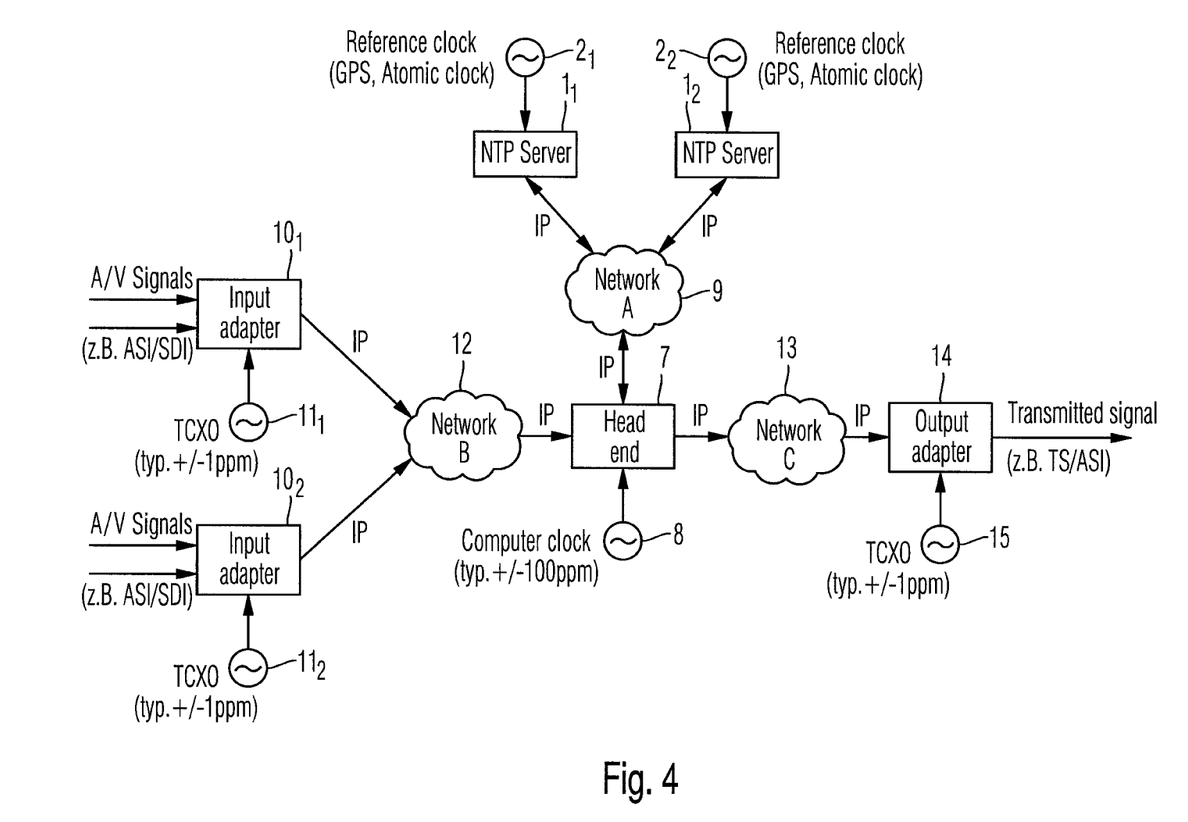
FIG. 4 illustrates a block-circuit diagram of a system for optimizing short-term stability of a clock pulse, in accordance with example embodiments of the present invention.

An example embodiment of a system for optimizing short-term stability of a clock pulse for a clock source in a process computer, for example in a head end of a radio station, is illustrated in FIG. 4.

The head station (head end) 7 of a radio-broadcasting station, in which various video and audio datastreams are encrypted and combined to form a single digital, encrypted transport datastream, is typically realized by a process computer, that is, by a server with a sufficiently large computing power for the realization of signal-processing functions in real-time.

The server of the head end 7 is clocked by an internal clock source 8, which provides a comparatively poor accuracy by comparison with a reference-clock source—for example the GPS-time or the UTC-time used by NTP-servers. With commercially available servers, this is typically within the order of magnitude of +/−100 ppm. Such a poor accuracy of the clock source leads to a drift—that is, a clock variation—of the clock pulses generated by the clock source, which leads to an inaccuracy of the clock time of the clock source by comparison with a reference-clock time of a reference-clock source in the order of magnitude of a few tens of milliseconds over a running time of one hour. Such an inaccuracy in the absolute clock time of the clock source is unacceptable for the real-time operation of a head end, because the data packets of the encrypted transport datastream, which are provided with a timestamp from the clock source, are buffered in the buffers of the individual transmitters either for too long and therefore cause an overflow of the buffers, or are buffered for too short a time and therefore cause a zero loading of the buffers. Both cases lead to an undesirable operational disturbance.

In order to increase the accuracy of the internal clock source 8, the clock pulse of this clock source 8 is synchronized with the reference clock of a reference-clock source. As already mentioned above, the clock-cycle number of the reference-time source $2_1$ or respectively $2_2$ counted in the individual NTP-servers $1_1$ or respectively $1_2$ at a given calling time since an initialization time is transmitted for this purpose to the head end 7 via the data-packet orientated network 9, preferably via the Internet using the method of the Network-Time-Protocol (NTP) from several NTP-servers $1_1$ or respectively $1_2$, which are each coupled to a high-precision reference-time source $2_1$ or respectively $2_2$ (for the UTC reference time). With regard to the details of the method of the Network-Time-Protocol (NTP), reference is made to David L. Mills "Internet Time Protocol: The Network Time Protocol", IEEE Transactions on Communications, Volume 39, Number 10, October 1991, pages 1482 to 1493, the entirety of which is incorporated herein by reference.

The individual video and audio datastreams associated respectively with each of the programs, which are generated in one or more studios, are transmitted in different data formats (for example, Serial-Digital-Interface (SDI) for un-compressed digital video data, Asynchronous-Serial-Interface (ASI) for pre-compressed digital video data, and Audio-Engineering-Society-3 (AES3) for digital audio data) from the individual studios to the head end 7. These are then filled in associated input adapters $10_1$ or respectively $10_2$, which are positioned close to the head end 7 and coupled to clock sources $11_1$ or respectively $11_2$ with a comparatively high accuracy in the order of magnitude of +/−1 ppm, into data packets, which are transmitted to the head end 7 via a local, high-speed network 12, preferably via an intranet.

In a similar manner, the transport datastream generated by the head end 7 is transmitted with its individual data packets via a local high-speed network 13, preferably via the intranet, to an output adapter 14 positioned close to the head end 7 with a clock source 15 with a high-frequency stability in the order of magnitude of +/−1 ppm, in which the data packets of the incoming transport datastream are converted from Internet Protocol (IP) data format into an appropriate data format (for example, Asynchronous Serial Interface (ASI)) for transmission to the individual transmitters.

Figure 8A:
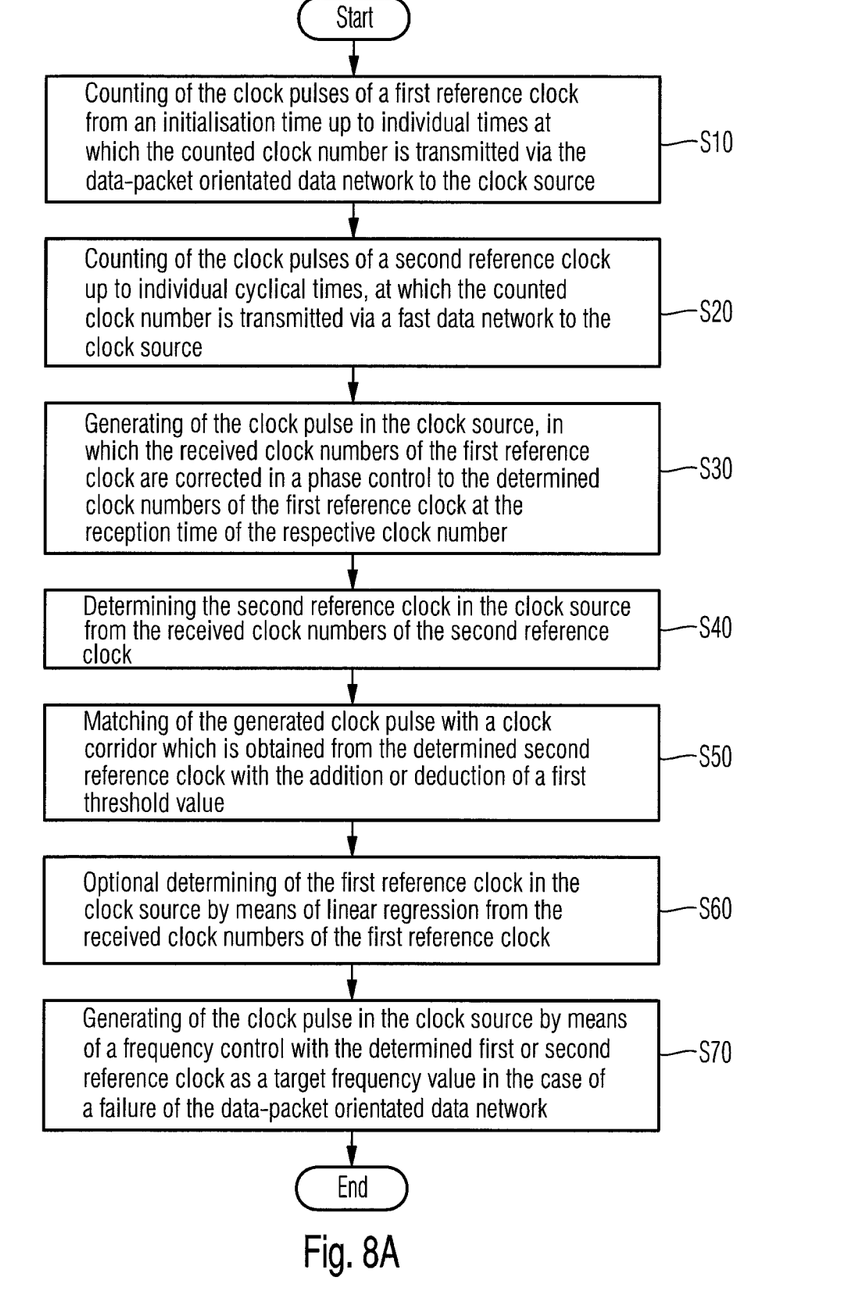
FIG. 8A illustrates a flow chart depicting a first method for optimizing short-term stability of a clock pulse, in accordance with example embodiments of the present invention.

In the following section, in accordance with such embodiments for optimizing short-term stability of a clock pulse for a clock source in a process computer, for example in a head end of a radio station, a first example method is presented on the basis of the flow-chart in FIG. 8A with reference to the corresponding system illustrated in the block-circuit diagram of FIG. 4.

In a first method step S10, in at least one first reference-clock source, preferably according to FIG. 4, within the NTP-servers $1_1$ or respectively $1_2$, the clock pulses of a clock generator $2_1$ or respectively $2_2$, the clock pulse of the UTC time, are counted from a defined or agreed initialization time, in each case in a counter not illustrated in FIG. 4. If the individual NTP-server $1_1$ or respectively $1_2$ receives a time request from an associated clock filter $3_1$ or respectively $3_2$ integrated in the head end 7 at a given time, the counter status of the counter associated with the respective NTP-server $1_1$ or respectively $1_2$ at this time is read out and transmitted in a data packet as a timestamp information for transmission via the data-packet orientated network 9.

After the reception of each data packet with a timestamp information in the associated clock filter $3_1$ or respectively $3_2$, the associated clock filter $3_1$ or respectively $3_2$ determines the transmission time of each data packet, which contains, as timestamp information, a clock number of the associated first reference-clock source $1_1$ or respectively $1_2$ at the transmission time as a mean value of the reception time of the data packet containing a clock number and of the transmission time of the associated time request through the associated clock filter $3_1$ or respectively $3_2$. The average formation represents merely an approximation. More precise results for the transmission time are obtained by implementing several time requests to the associated reference-clock sources $1_1$ or respectively $1_2$ at relatively short time intervals from the associated clock filter $3_1$ or respectively $3_2$ and taking these into consideration in an appropriately selected averaging function.

Additionally, by means of an NTP-algorithm, such as has already been mentioned, the most correct clock number of a first reference-clock source $1_1$ or respectively $1_2$ at the associated transmission time is selected from the clock-cycle numbers of the associated first reference-clock sources $1_1$ or respectively $1_2$ at the associated transmission times received in each case from the individual clock filters $3_1$ or respectively $3_2$. Additionally, in the clock filters $3_1$ or respectively $3_2$ or in the NTP-algorithm, the clock-cycle number of the associated first reference-clock source $1_1$ or respectively $1_2$ at the reception time of the data packet containing a clock-cycle number is determined in the head end 7 by determining the clock-cycle number of the associated first reference-clock source $1_1$ or respectively $1_2$ received in the head end 7 at the associated transmission time around the determinable clock-cycle number of the first reference clock between each transmission time of the data packet with the clock-cycle number in the respective NTP-server $1_1$ or respectively $1_2$ and the reception time of the data packet with the clock-cycle number in the head end 7.

In the next method step S20, in at least one input adapter $12_1$ or respectively $12_2$, to which a second reference-clock source $11_1$ or respectively $11_2$ is allocated in each case, the clock cycles of the second reference clock generated by the second reference-clock source $11_1$ or respectively $11_2$ are counted in a counter, which is associated with the respective input adapter $12_1$ or respectively $12_2$ and not illustrated in FIG. 4. At cyclical times, the respectively counted clock-cycle numbers of the second reference clocks generated by the individual second reference-clock sources $11_1$ or respectively $11_2$ are transmitted to the head end 7 via a second network 12, preferably a fast, high-speed network. By analogy with method step S10, the transmission times of the individual data packets, which contain clock-cycle numbers of the individual second reference-clock sources $11_1$ or respectively $11_2$, are determined in the head end 7.

In the next method step S30, within the framework of a phase control 6, the clock pulse of the clock source 8 is generated on the basis of the clock-cycle numbers of the selected first reference-clock source $1_1$ or respectively $1_2$ received in each case at the individual reception times and the clock-cycle number currently counted at the associated individual reception times of the data packets with clock-cycle numbers of the first reference clock respectively in the selected first reference-clock source $1_1$ or respectively $1_2$ by controlling the difference between the individual, received clock-cycle numbers of the selected first reference-clock source $1_1$ or respectively $1_2$ and the determined clock-cycle numbers of the selected first reference-clock source $1_1$ or respectively $1_2$ to zero at the reception times of the data packets containing the associated clock-cycle numbers.

Figure 7:
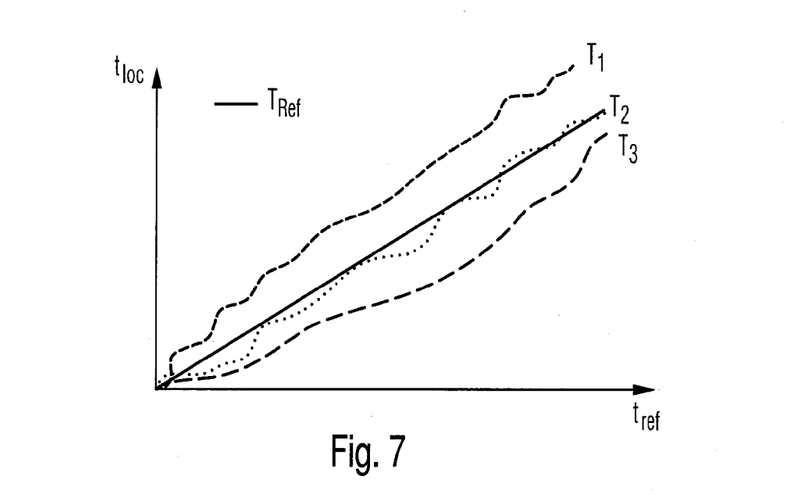
FIG. 7 illustrates a time-flow diagram of the accumulated clock pulses from several clocks with respectively different frequency drift, in accordance with example embodiments of the present invention.

In the next method step S40, second reference clocks are determined from the received clock-cycle numbers from the second reference-clock source $11_1$ or respectively $11_2$ and the determined transmission times of the data packets which contain the respective clock-cycle numbers of each reference-clock source $11_1$ or respectively $11_2$. If the second reference clocks determined are not constant, linearized second reference clocks are determined in each case via a preferably linear regression of a relatively large number of received clock numbers. While only one reference-clock source is used in each case in the first variant of the invention, several reference-clock sources $11_1$ or respectively $11_2$ are used in a second variant of the invention. A second reference clock with a comparatively high frequency accuracy, which already comes very close to the correct second reference clock illustrated in FIG. 7, is achieved by means of an averaging of the individual, linearized or non-linearized second reference clocks.

Figure 5:
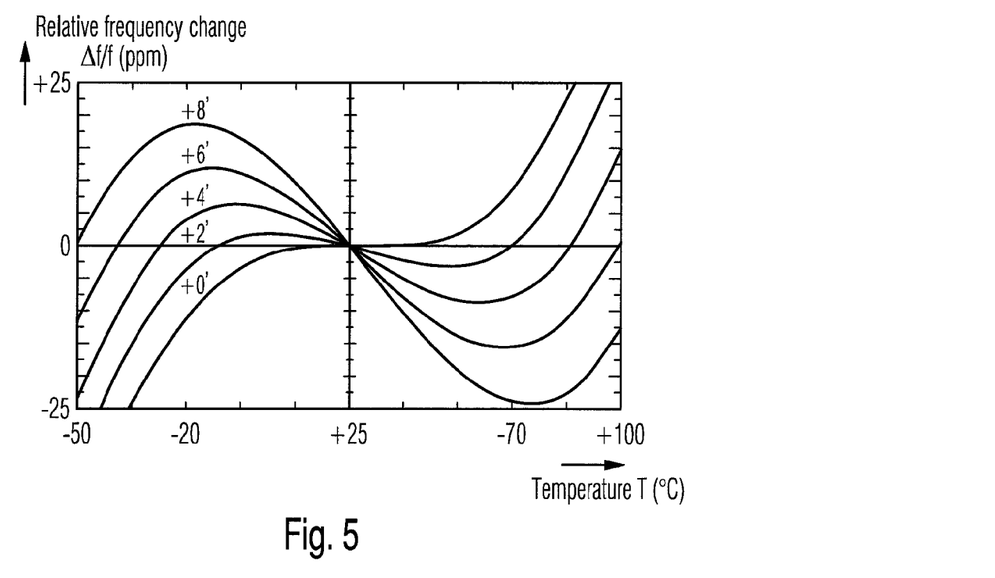
FIG. 5 illustrates a diagram illustrating the relative frequency change of a quartz oscillator dependent upon temperature and the intersection angle of the quartz, in accordance with example embodiments of the present invention.
Figure 6:
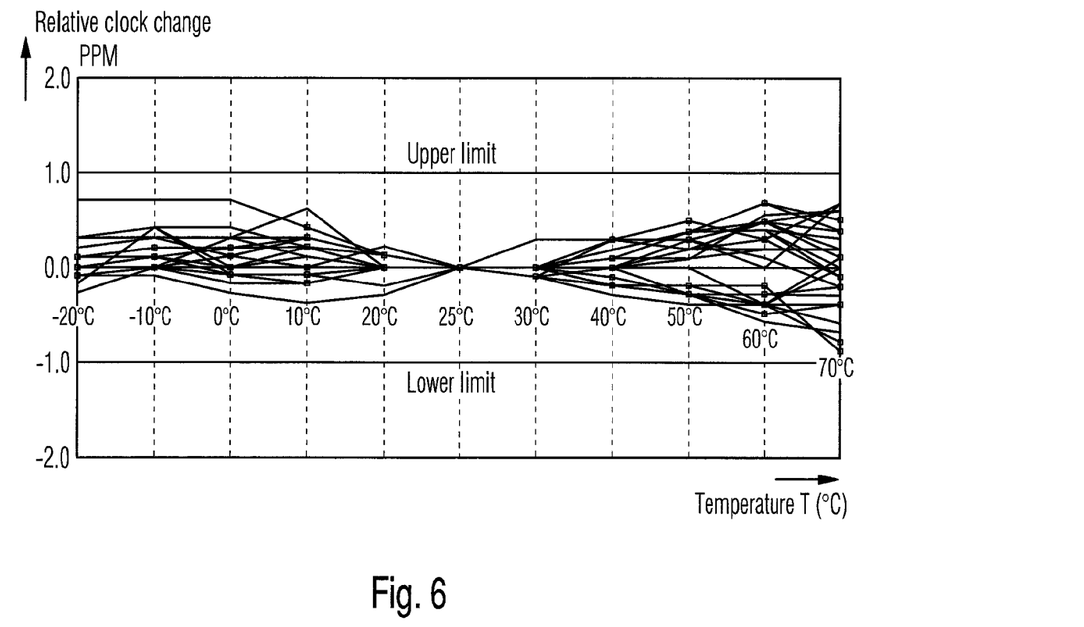
FIG. 6 illustrates a diagram illustrating the relative change in clock pulse in the case of an averaging of the clock pulses generated by several temperature-compensated quartz oscillators, in accordance with example embodiments of the present invention.

The frequency oscillators of the individual reference-clock sources $11_1$ or respectively $11_2$ are preferably temperature compensated. A dependency between the relative frequency dependency of a non-temperature compensated frequency oscillator upon the ambient temperature corresponding to FIG. 5 is therefore not present. On the contrary, the relevant frequency fluctuations of the individual temperature-compensated frequency oscillators dependent upon temperature are significantly less strongly pronounced and, according to FIG. 6, fluctuate significantly less on the basis of inaccuracies, manufacturing tolerances and compensation inaccuracies of the temperature compensation. An averaging of the individual second reference clocks, which are generated by temperature-compensated frequency oscillators, leads to a significantly reduced frequency inaccuracy of the accordingly averaged second reference clock.

In the next method step S50, the clock pulse generated by the phase-locked loop 6 is matched with a clock-pulse corridor, which corresponds to the second reference clock determined in the preceding method step S40 subject to the addition or deduction of an appropriately adjustable first threshold value. If the clock pulse generated by the phase-locked loop 6 is disposed outside this clock-pulse corridor, the generated clock pulse is guided to the clock-pulse limit of the clock-pulse corridor by means of a superordinate frequency-locked loop, which is disposed nearest to the clock pulse generated.

In a next method step S60 to be implemented optionally in the head end 7 in an equivalent manner to the determination of the second reference clock in method step S40, a first reference clock is determined by means of a preferably linear regression from the individual clock numbers of the first reference clock received in the head end 7 and the actually accumulated clock numbers of the first reference clock at the reception times of the individual data packets, which contain the clock-cycle numbers of the first reference clock.

In the final method step S70, in the case of a failure of the data-packet orientated network 9, the clock pulse of the clock source 8 is generated as the target frequency value by means of a frequency control with the first reference clock determined up to the time of the failure of the data-packet orientated network 9 using a linear regression. A clock pulse of the clock source 8 with a relatively higher precision is achieved by using the second reference clock determined in method step S40 as the target frequency value of the frequency control, because the second reference clock can also be determined during the failure of the data-packet orientated network 9 in a head end 7. As soon as the correct operation of the data-packet orientated network 9 has been restored, it is possible to switch back from the frequency control to a phase control for the generation of the clock pulse of the clock source 8.

Figure 8B:
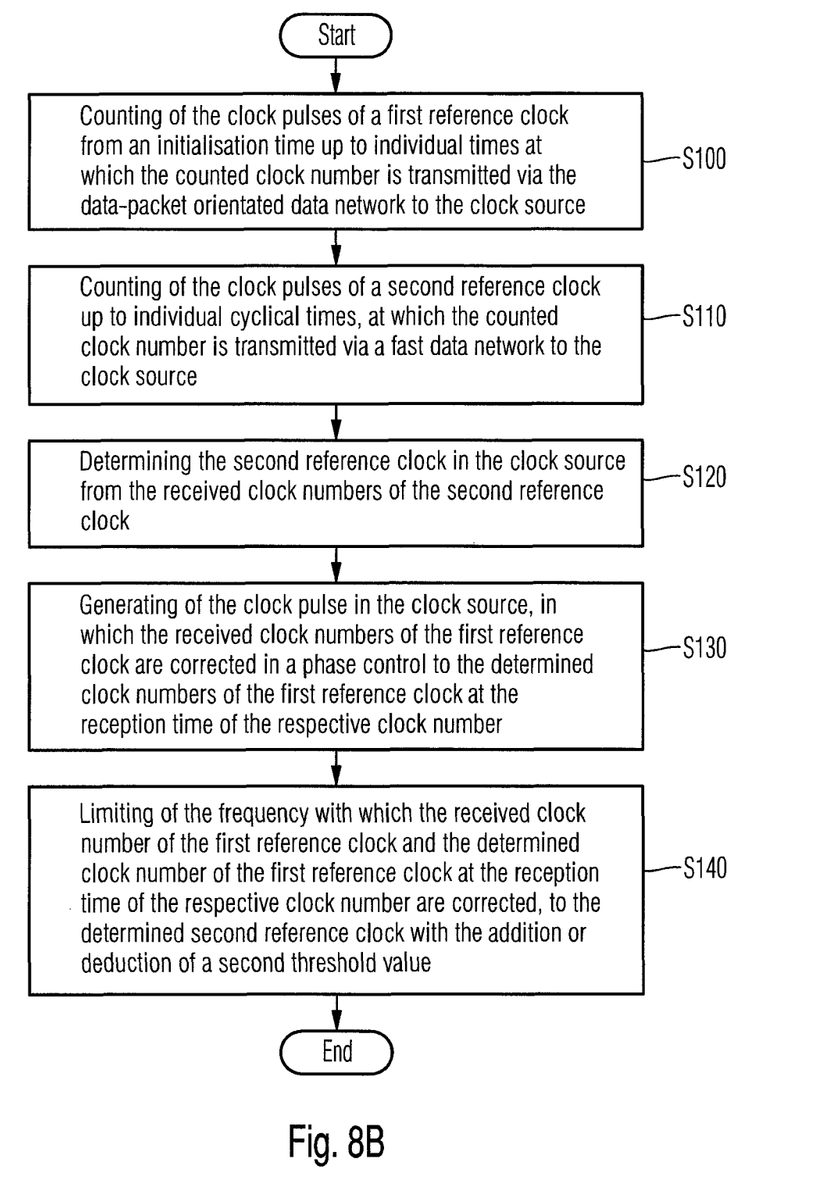
FIG. 8B illustrates a flow chart depicting a second method for optimizing short-term stability of a clock pulse, in accordance with example embodiments of the present invention.

In the following section, in accordance with such embodiments for optimizing short-term stability of a clock pulse for a clock source in a process computer, for example in a head end of a radio station, a second example method is presented on the basis of the flowchart in FIG. 8B with reference to the corresponding system illustrated in the block-circuit diagram of FIG. 4.

The first method steps S100, S110 and S120 of the second embodiment correspond to the method steps S10, S20 and S40 of the first embodiment and will therefore not be explained in greater detail at this point.

In the next method step S130, the clock pulse of the clock source 8 is determined in a phase-locked loop, in which the phase difference between the individual received clock numbers of the first reference clock and the clock numbers of the first reference clock determined in the head end 7 at the reception times of the individual data packets, which in each case contain clock numbers of the first reference clock, are corrected in the head end 7.

In the final method step S140, which is implemented in parallel time with method step S130, the frequency of the voltage-controlled frequency oscillator in the phase control, with which the individual received clock numbers of the first reference clock in the determined clock numbers of the first reference clock at the reception times of the data packets with clock numbers of the first reference clock and therefore the clock pulse generated in the clock source 8 are controlled to the first reference clock, is limited, within the phase control, to a frequency corridor, which is adjusted through the determined second reference clock, subject to the addition or deduction of an adjustable second threshold value.

Optionally, the method steps S60 and S70 provided in the first embodiment can be implemented following method step S140 in the second embodiment.

Figure 8C:
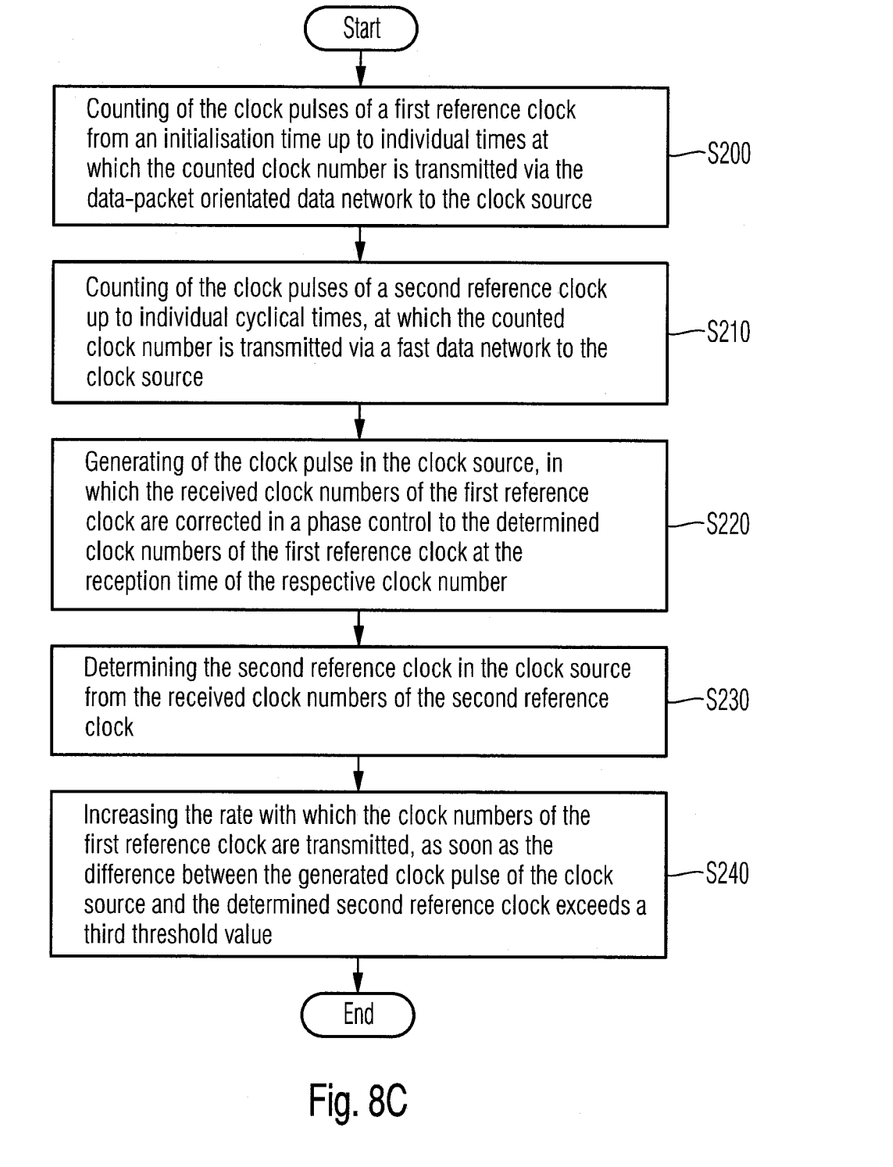
FIG. 8C illustrates a flow chart depicting a third method for optimizing short-term stability of a clock pulse, in accordance with example embodiments of the present invention.

In the following section, in accordance with such embodiments for optimizing short-term stability of a clock pulse for a clock source in a process computer, for example in a head end of a radio station, a third example method is presented on the basis of the flow chart in FIG. 8C with reference to the corresponding system illustrated in the block-circuit diagram of FIG. 4.

The method steps S200, S210, S220, S230 of the third embodiment correspond to the method steps S10, S20, S30 and S40 of the first embodiment.

In the final method step S240, the rate, with which the individual clock numbers of the first reference clock are called from the head end 7 by the individual NTP-servers $1_1$ or respectively $1_2$ and their associated first reference-clock sources $2_1$ or respectively $2_2$ is increased as soon as the difference between the generated clock pulse of the clock source 8 and the determined second reference clock exceeds an adjustable third threshold value.

The invention is not restricted to the embodiments presented. All combinations of the features claimed in the claims, of the features disclosed in the description and the features illustrated in the drawings are also covered by the invention.

The invention claimed is:

1. A method comprising:
    transmitting clock-cycle numbers of a first reference clock signal of a first reference-clock source to a clock source between an initialization time and several times within a data-packet network, wherein the clock source is synchronized with a first long-term stable reference-clock source;
    adjusting a clock pulse of the clock source by controlling a difference between clock-cycle numbers of the first reference clock signal received in the clock source and clock-cycle numbers of the first reference clock signal between the initialization time and the respective reception times of the clock-cycle numbers of the first reference clock signal, wherein the frequency of a frequency oscillator integrated in a phase control is used for matching the received clock-cycle numbers of the first reference clock signal;
    transmitting clock-cycle numbers of at least one second reference clock signal of a data packet, which receives the clock-cycle number from at least one second, free-running reference-clock source at individual times to the clock source; and
    limiting the difference between the clock pulse of the clock source and each second reference clock signal to a first adjustable threshold value.

2. The method according to claim 1, wherein the clock pulse of the clock source in a superposed frequency control is controlled in such a manner that the difference between the clock pulse of the clock source and the second reference clock signal is less than the first adjustable threshold value.

3. The method according to claim 1, wherein the difference between the frequency with which the difference between the clock pulse of the clock source and the first reference clock signal is controlled within a phase-locked loop and the second reference clock signal is limited to a second adjustable threshold value.

4. The method according to claim 1, wherein the clock-cycle numbers of the second reference clock signal of the respective at least one second reference-clock source are each transmitted at periodic times, and a second reference clock signal of the respective at least one second reference-clock source is determined from the received clock-cycle numbers of the second reference clock signal of the respective second reference-clock source in the clock source.

5. The method according to claim 1, wherein the second reference clock signal of a single, second reference-clock source is determined in the clock source.

6. The method according to claim 1, wherein the second reference clock signal is determined by averaging the second reference clock signals in the clock source generated respectively from the at least one second reference-clock source.

7. The method according to claim 6, wherein the at least one second reference-clock source comprises a temperature-compensated quartz oscillator.

8. The method according to claim 1, wherein, in the case of a failure of the data-packet network, the second reference clock signal is determined continuously from the received clock-cycle numbers of the second reference clock signal by means of regression, and the clock pulse of the clock source is determined within a frequency control with the determined second reference clock signal as the target frequency value.

9. The method according to claim 1, wherein, in the case of a failure of the data-packet network, the first reference clock signal is determined by means of regression from the clock-cycle numbers of the first reference clock signal received until the failure, and the clock pulse of the clock source is determined within a frequency control with the determined first reference clock signal as the target frequency value.

10. The method according to claim 1, wherein the rate with which the clock-cycle numbers of the first reference clock signal are transmitted to the clock source is increased, as soon as the difference between the clock pulse of the clock source and the second reference clock signal exceeds a third adjustable threshold value.

11. The method according to claim 1, wherein the maximum difference between the first and the second reference clock signals of the clock source is known or specified.

12. A system comprising:
a first processing device configured to determine clock-cycle numbers of a first reference clock signal of a first reference-clock source between an initialization time and several times,
wherein the first processing device is further configured to transmit, via a data-packet network, the clock-cycle numbers of the first reference clock signal to a third processing device;
a second processing device configured to determine clock-cycle numbers of a second reference clock signal between the initialization time and the respective several times,
wherein the second processing device is further configured to transmit, via a second network, the clock-cycle numbers of the second reference clock signal determined respectively from each second reference-clock source to the third processing device,
wherein the third processing device is configured to determine a clock pulse based on the received clock-cycle numbers of the first reference clock signal and the received clock-cycle numbers of the second reference clock signal, wherein the clock source is synchronized with a first long-term stable reference-clock source, and
wherein the frequency of a frequency oscillator integrated in a phase control is used for matching the received clock-cycle numbers of the first reference clock signal.

13. The system according to claim 12, wherein the second reference-clock source comprises a temperature-compensated quartz oscillator.

14. The system according to claim 12, wherein the second network is a local high-speed network.

15. The system according to claim 12, wherein a maximum difference between the first reference clock signal and the second reference clock signal of the clock source is known or specified.

* * * * *